Feb. 20, 1968    OSAMU TSUCHIMOCHI    3,369,501
MONOCABLE AERIAL CAR
Filed May 25, 1965    6 Sheets-Sheet 3
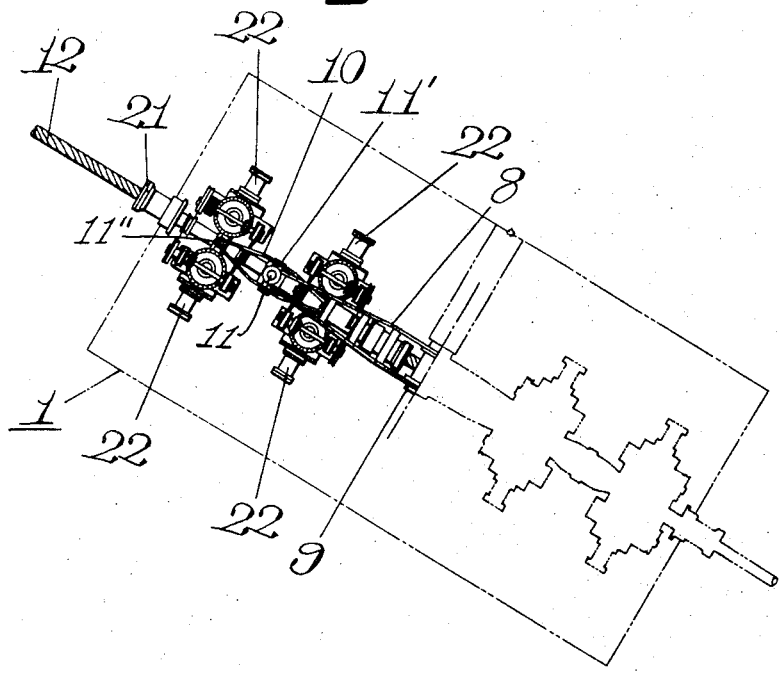
INVENTOR.
OSAMU TSUCHIMOCHI
BY
ATTORNEYS Feb. 20, 1968

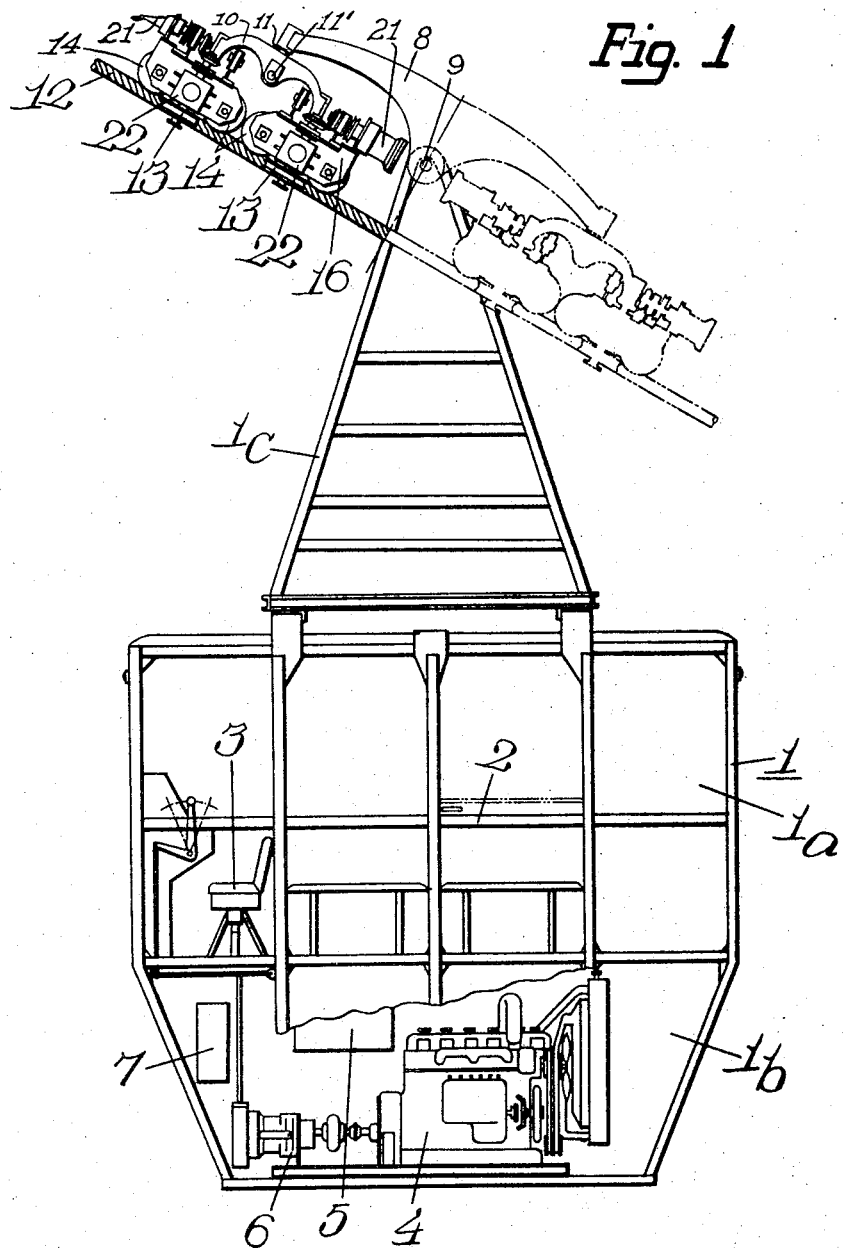

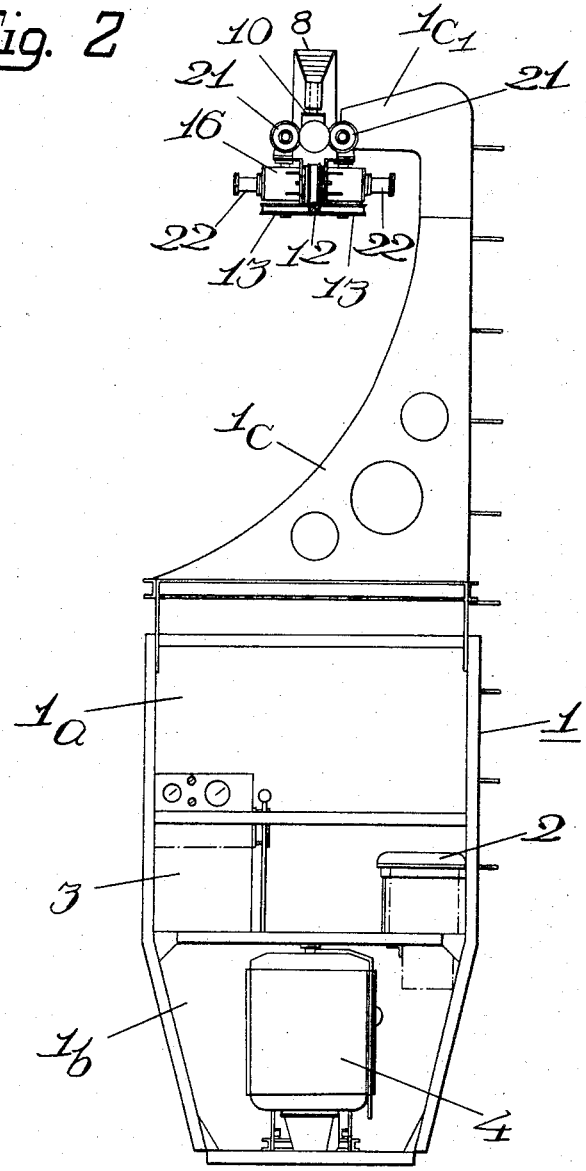

OSAMU TSUCHIMOCHI 3,369,501

MONOCABLE AERIAL CAR

Filed May 25, 1965

INVENTOR.
OSAMU TSUCHIMOCHI
BY
ATTORNEYS

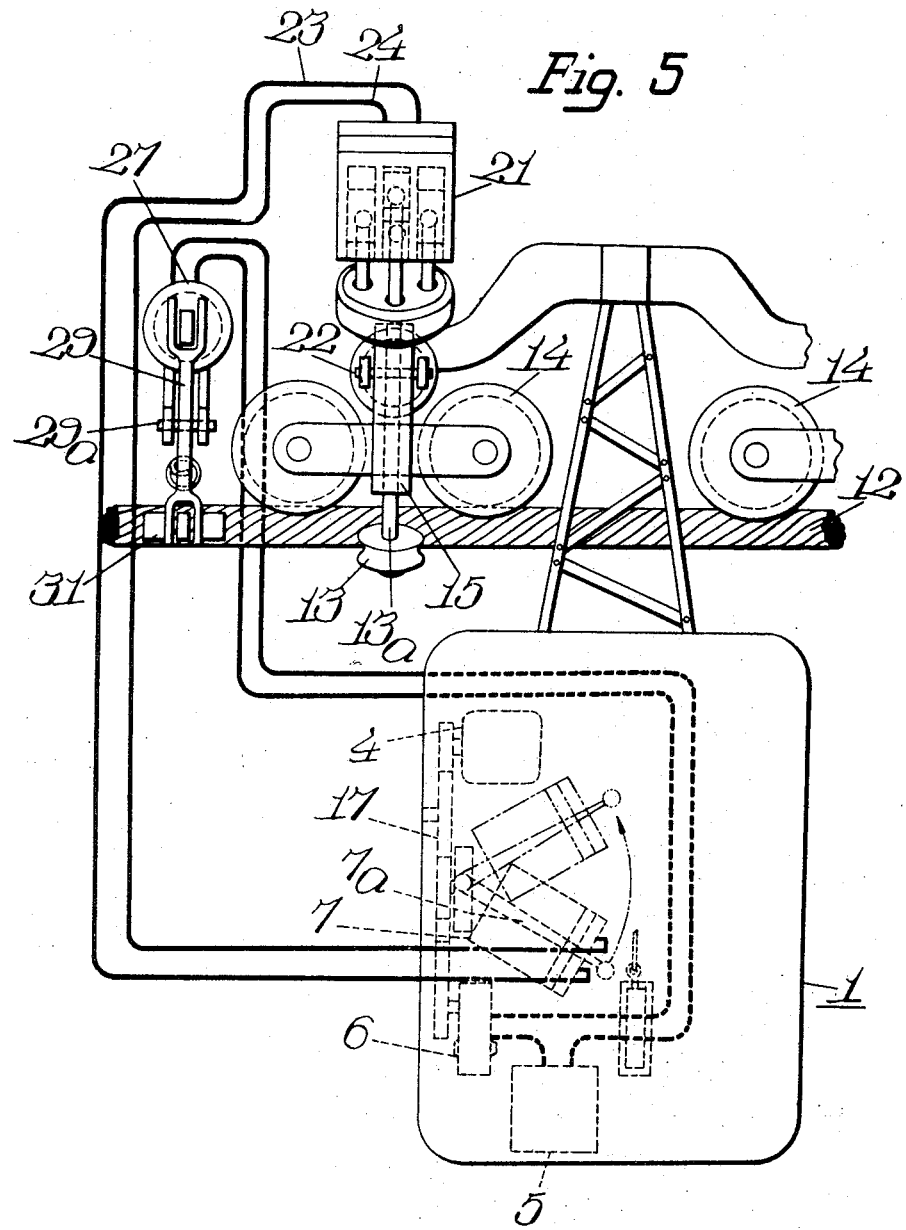

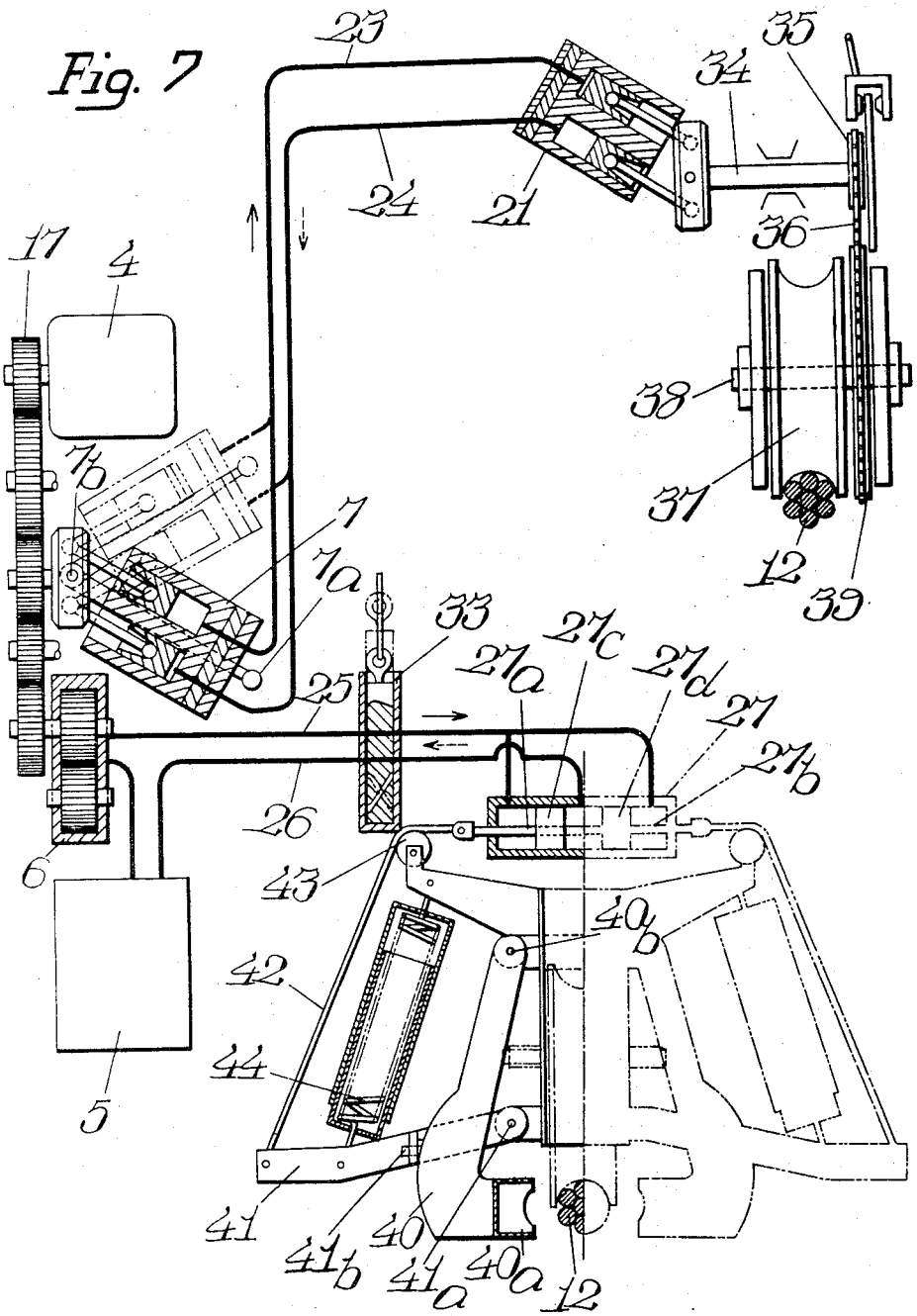

3,369,501
MONOCABLE AERIAL CAR
Osamu Tsuchimochi, 45, Ikegami Tokumachi-cho,
Ohta-ku, Tokyo, Japan
Filed May 25, 1965, Ser. No. 458,572
Claims priority, application Japan, June 9, 1964,
39/32,368; Mar. 24, 1965, 40/16,819
8 Claims. (Cl. 105—150)

ABSTRACT OF THE DISCLOSURE

A self-propelled monocable aerial ropeway car is disclosed in which the car body is swingably supported from a pivot axle extending laterally from an elongated main support beam at approximately the center thereof. The ends of this main support beam have pivoting bearing engagement with respective vertical pivots each of which is mounted for pivoting about a horizontal pivot which extends laterally from the midportion of a respective beam member.

The ends of each beam member have pivotal bearing engagement with respective vertical pivots each of which is mounted for pivoting about a horizontal pivot on a respective truck each having a pair of grooved support wheels engaging a ropeway constituting the monocable. Each truck has driving wheels drivingly engageable with the monocable, and these driving wheels are driven by hydraulic motor means on the trucks.

The car body carries, at its lower portion, a prime mover driving a hydraulic pump which is preferably a reversible flow pump, and flexible hydraulic fluid lines interconnect this hydraulic pump to the hydraulic motors on the trucks. Each truck further includes brake means which are continuously biased to engage the ropeway to arrest movement of the trucks therealong, and these brake means have operating elements subjected to the pressure in the hydraulic lines to disengage the brake means from the ropeway or monocable, selectively operable valve means being provided whereby the brake means may be engaged at any time. However, should the hydraulic pressure fail, the brake means automatically clamp onto the ropeway or monocable.

*Background of the invention*

This invention relates to a monocable aerial ropeway car.

An object of the present invention is to provide a monocable aerial ropeway car which can be driven on an aerial cableway that is branched or curved acutely laterally or curved either acutely or slowly upwardly in the same manner as on a substantially straight cableway regardless of the varied configuration of the land in which the ropeway is installed.

Another object is to provide a monocable aerial ropeway car which cannot only be stopped at and started from any desired place but also driven at increased or decreased speed on the cableway easily and in safety.

A further object is to provide a monocable aerial ropeway car which can be driven in safety and braked and brought to a stop automatically and manually in case the car is stalled on the cableway and which can also be repaired or rescued in an emergency by the operation or rescue car.

A further object is to provide a monocable aerial ropeway car which can be produced at a lower cost than any other ropeway car of the conventional type.

With these objects in view and other objects hereinafter set forth, the arrangement of each part will be described in the specification and the appended claims.

In the drawings illustrating the preferred embodiments of this invention:

FIG. 1 is a side elevational view of the monocable aerial ropeway car according to the present invention, part thereof being cut away;

FIG. 2 is a front elevational view of the monocable aerial ropeway car according to the present invention, part thereof being cut away;

FIG. 3 is a top plan view of the same;

FIGS. 4 and 5 are views showing the driving mechanism of the same;

FIG. 7 is a view illustrating the driving mechanism of another embodiment of the present invention.

Figure 6:
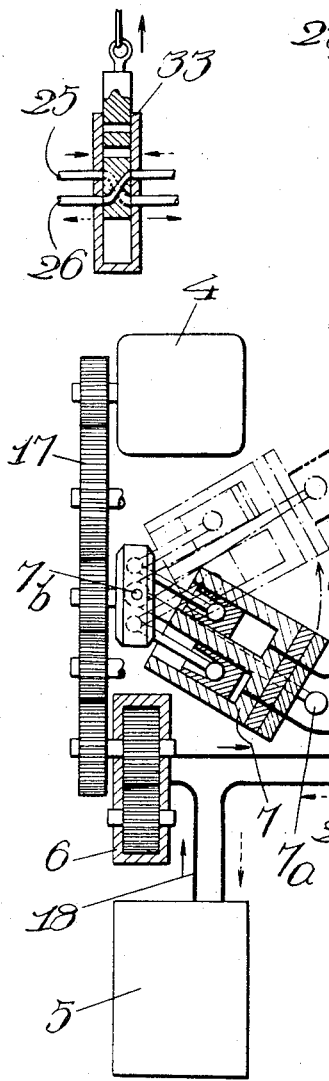
FIG. 6 is a longitudinal cross-section of the valve member.

Referring to the drawings by way of an explanation of this invention, reference character 1 is a body of the ropeway car having an upper part or passengers' chamber 1a and a lower part or machine cabinet 1b. The passengers' chamber 1a is equipped with passengers' seats 2 and driver's seat 3, and inside the machine cabinet 1b are installed prime mover 4, oil tank 5, oil pump 7 and auxiliary oil pressure pump 6. Preferably the center of gravitation of the body member 1 may be removed to a lower point by the proper arrangement of these members inside the machine cabinet 1b.

Mounted securely to the upper part of the body member 1 is a hanger arm 1c formed with a laterally extending carrying arm $1c_1$ to which is mounted a bracket 8 swingable about the axis 9.

The reference character 12 is a cable, 13 grooved driving rollers and 14 grooved suspension rollers. The axles 13a of the driving rollers 13 are carried inside the bearing means 15a, 15b mounted on the bar member 15 secured to a beam 10 which is swingably and rotatably secured at its central part to the main support beam 8 by a stud shaft 11 having an upright stud rotatably fitted to the end of main beam 8 and a shaft 11' extending laterally of the lower end of stud 11 and pivotally secured to the beam member 10. The axles of suspension rollers 14 are rotatably carried inside the frame of a truck 16 which is connected, at its central portion, to the beam member 8 so that it is swingable in both a vertical direction and in a horizontal direction. The connecting means includes a stud shaft 11'. The driving rollers are constructed in such a way that they may be engaged with or disengaged from the cable 12 through the working mechanism which will be described hereinafter.

The oil pressure pump 7 is worked by the prime mover 4 through transmission 17 together with the auxiliary oil pressure pump 6 connected to the oil tank 5 by way of the suction pipe 18. The pressure oil servo-motor members 21 are connected to the oil pressure pump 7 through inlet pipe 23 and outlet pipe 24. The direction and speed of rotation of the pressure oil servo-motors 21 and consequently the rotation of axles 13a of the driving rollers 13 may be manually adjustable by operating the handle 7a mounted to the oil pressure pump 7 about the axis 7b. As known, the rotary movement of the prime mover is converted into the reciprocating movement in the piston cylinder member of the oil pressure pump. The reciprocating motion of the piston cylinder member is transmitted to the pressure-oil servo-motors through oil conduits and converted into rotary movement of the driving axles of the driving rollers.

The piston cylinder member 22, which is connected to the auxiliary pressure pump 6 by means of pipes, is provided with pistons 22c, 22d having reciprocable rods 22a, 22b. The ends of the reciprocable rods 22a, 22b projecting from the cylinder member 22 are pivoted to the bearing means 15b mounted to the bar member 15 secured to the beam 10. The other bearing means 15a mounted to the bar member 15 are pivoted to the bosses $22e_1$, $22e_2$ mounted to the wall member $22e$ of the piston cylinder member 22.

An inlet pipe 25a branched from the main pipe 25 connecting the pump 6 is connected to the pressure oil chamber of the piston cylinder member 22 defined by the pistons 22c, 22d, while outlet pipes 26a branched from the main pipe 26 connecting to the tank 5 are connected to the pressure oil chambers at the opposite sides of the piston cylinder member 22. As the pressure oil is supplied through the inlet pipe 25 and branched pipe 25a into the pressure oil chamber of the piston cylinder member 22 defined by the pistons 22c, 22d, the bearing means 15a mounted to the bar member 15 are turned about the axles $22e_3$, $22e_4$ to cause the driving rollers 13 to engage the opposing sides of the cable 12.

The auxiliary piston cylinder 27 for imparting the braking action to the ropeway car is provided with pistons 27c, 27d having reciprocable rods 27a, 27b.

The ends of the reciprocable rods 27a, 27b are pivoted to the ends of the laterally swingable lever member 28, 29 by the axles 27a, $27b_1$, and to the other ends of the lever member 28, 29 are pivoted the braking lever member 30, 31 by the axles 30a, 31a. The ends of the braking lever member 28, 29 are free to be engaged with and disengaged from the cable 12 through the pressure oil action of the piston cylinder member 27. A torsion spring 32 is mounted between the lower parts of the opposing braking levers 28, 29. The outlet pipe 26 is connected to the chamber of the piston cylinder member 27 defined by the pistons 27c, 27d while to the chambers at the opposite sides of the piston cylinder member 27 are connected the inlet pipe 25 and the branched pipe 25b.

In operation, the braking levers are detached from the cable 12 as long as the pistons 27c, 27d are pushed inwardly by the pressure oil supplied through the inlet pipe 25 and the branched pipe 25b, and in case the oil pressure decreases or the oil pressure action ceases to work by some disorder, the braking levers 30, 31 are pressed to the cable 12 by the compression of the torsion spring 32, and the car is stopped immediately.

Figure 4:
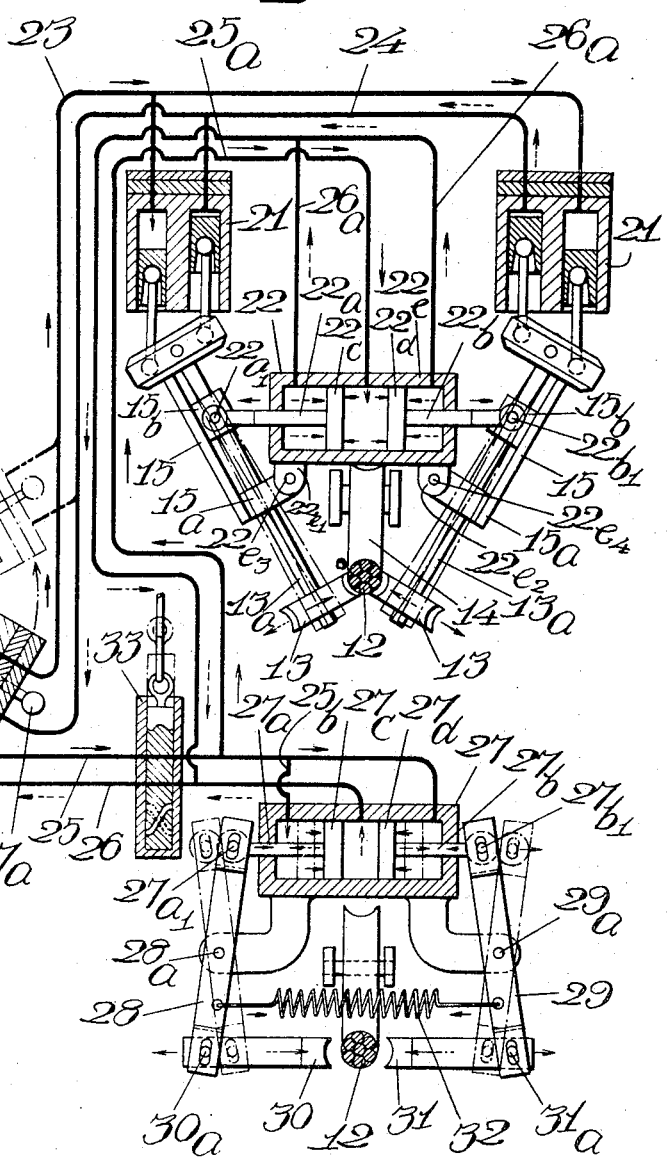

At 33 is indicated a valve member which is manually operable to change over the inlet conduit to the outlet conduit and the outlet conduit to the inlet conduit. Thus the pressure oil action imparted to the piston cylinder members 22 and 27 may be reversed in direction by the manual operation of the valve member 33, disengaging the driving rollers 13 from the cable 12 and pressing the braking levers to the cable 12, and the car is stopped immediately. Referring to FIG. 7 by way of an explanation of another embodiment of the oil pressure driving mechanism, numeral 4 is a prime mover, 5 an oil tank, 6 an auxiliary oil pressure pump, 7 an oil pressure pump, 7a a handle, 7b an axle, 17 a transmission, 21 a pressure oil servo-motor, 23 and 25 inlet pipe members, 24 and 26 outlet pipe members, 27 a piston cylinder member for imparting a braking action to the car, 33 a change-over valve, and 12 a cable. These members are worked in the same way as those described in the foregoing embodiment with reference to FIGS. 1 to 6 inclusive.

A driving axle 34 is rotated by the pressure-oil servomotor 21. Sprocket 35 mounted to the end of said axle 34 is operatively associated with sprocket 39 mounted to the axis 38 of the grooved driving roller 37 through an endless chain 36. As the sprocket 35 is rotated by the oil pressure action the sprocket 39 may be rotated coaxially with the axis 38, causing the driving roller 37 to roll along the cable 12.

Numeral 40 is a braking lever having a detent means 40a, 41 a working lever, 42 a connecting rope, 43 a guide roller and 44 a torsion spring. A braking piston cylinder member 27 is provided with pistons 27c, 27d having reciprocable rods 27a, 27b to which are connected the one ends of the connecting rope members 42 coupled at the other ends to the working levers 41 by way of the guide rollers 43. The working levers 41 are secured to the reverse sides of the braking levers 40 by fixtures 41 and pivoted at the other ends by the axles 41a. The braking levers 40 are pivoted by the axles 40b. A torsion spring 44 is mounted between the beam and the braking lever 40.

As pressure oil is supplied through the inlet pipe 25 into the chambers at the opposite sides of the piston cylinder 27, the pistons 27c, 27d are pushed inwardly by the oil pressure as seen in the figure, swinging upwardly the working levers 41 about the axes 41a through the connecting ropes 42 against spring 44 and swinging outwardly the braking levers 40 about the axes 40b and disengaging the detent means 40a from the cable 12. As soon as braking cylinder member 27 is free from the pressure oil action, the detent means 40a may engage with the cable 12 by the compression of springs 40, and the car is stopped. By manually adjusting the change-over valve 33, the pressure oil action may be reversed.

Although the description of the present invention has been made with reference to certain embodiments thereof, it is apparent that the present invention is not limited to these embodiments but may comprise other structures which may be included within the scope of the invention defined by the appended claims.

What is claimed is:

1. A self-propelled monocable aerial ropeway car comprising, in combination, an elongated main support beam; truck means supporting said beam and including at least one truck supporting each end of said beam, each truck including supporting wheels supported by a monocable constituting said aerial ropeway; connecting means pivotally connecting each end of said beam to the supporting truck means and providing for pivoting movement of each end of said beam, relative to the truck means supporting such end, about two manually perpendicular axes extending transversely of said cable, one axis being a generally horizontal axis and the other a generally vertical axis; a pivot axle extending laterally from said beam at substantially the midpoint of the length of the latter; a laterally offset hanger swingably suspended by its upper end on said pivot axle; a car body carried by the lower end of said hanger; driving wheels on said truck means drivingly engageable with said monocable; power generating means carried by said body; motor means on said truck means driving said driving wheels; flexible power supply means interconnecting said generating means and said motor means for driving of said motor means by said generating means; and brake means on said truck means selectively engageable with said monocable.

2. A self-propelled monocable aerial ropeway car, as claimed in claim 1, in which said power generating means comprises a hydraulic pump and driving means therefor; said motor means comprising hydraulic motor means; said flexible power supply means comprising flexible hydraulic circuit means interconnecting said pump and said hydraulic motor means for driving of said hydraulic motor means by said pump.

3. A self-propelled monocable aerial ropeway car, as claimed in claim 2, including spring means biasing said brake means into engagement with said monocable; and hydraulic actuator means connected to said hydraulic circuit means and to said brake means and operable to disengage said brake means from said monocable responsive to pressure in said hydraulic circuit means; whereby said brake means are automatically engaged with said monocable upon failure of pressure in said hydraulic circuit means.

4. A self-propelled monocable aerial ropeway car, as claimed in claim 3, in which each brake means includes a pair of brake shoes movable toward each other to clamp said monocable therebetween; each brake shoe being supported on a hanger pivotally connected to the associated truck; said spring means being operable between the frame of the associated truck and the respective hangers;

said hydraulic actuator means comprising a cylinder fixed relative to the frame of the associated truck and a pair of pistons mounted in each cylinder and each connected to a respective pivoted brake hanger.

5. A self-propelled monocable aerial ropeway car, as claimed in claim 1, in which said truck means comprises four trucks each having a pair of supporting wheels supported by said monocable; a pair of beam members, each beam member interconnecting a respective pair of trucks; the ends of said main support beam being connected to the midpoints of respective beam members; said connecting means including connecting means pivotally connecting each end of each beam member to a respective one of the associated pair of trucks and providing for pivoting movement of each end of the respective beam member, relative to the truck supporting such end, about two mutually perpendicular axes extending transversely of said cable, one axis being a generally horizontal axis and the other being a generally vertical axis.

6. a self-propelled monocable aerial ropeway car, as claimed in claim 2, including means mounting each of said driving wheels on said truck means for swinging movement into and out of driving engagement with said monocable; and hydraulic actuator means connected to said pump and to said mounting means and selectively operable to swing said driving wheels into and out of engagement with said monocable.

7. A self-propelled monocable aerial ropeway car, as claimed in claim 2, in which said hydraulic pump is a reversible flow hydraulic pump.

8. A self-propelled monostable aerial ropeway car, as claimed in claim 3, including a reversing valve interposed between said pump and said hydraulic actuator means and operable selectively to activate said hydraulic actuator means to apply said brake means to said monocable.

References Cited

UNITED STATES PATENTS

| | | | |
|---|---|---|---|
| 2,856,030 | 10/1958 | Snow | 188—170 X |
| 3,097,723 | 7/1963 | Schaler | 188—42 |
| 3,155,199 | 11/1964 | Bricker | 188—170 |
| 3,276,394 | 10/1966 | Goirand | 105—153 |

FOREIGN PATENTS

| | | |
|---|---|---|
| 635,468 | 3/1928 | France. |
| 810,279 | 3/1937 | France. |
| 1,302,355 | 7/1962 | France. |

ARTHUR L. LA POINT, *Primary Examiner.*

J. E. BABER, *Assistant Examiner.*